US00RE34979E

United States Patent [19]

Gringer

[11] E Patent Number: Re. 34,979

[45] Reissued Date of Patent: Jun. 27, 1995

[54] TOOL FOR CARRYING A SCRAPING OR STRIPPING BLADE

[75] Inventor: Donald Gringer, New York, N.Y.

[73] Assignee: Allway Tools, Inc., Bronx, N.Y.

[21] Appl. No.: 138,462

[22] Filed: Oct. 15, 1993

Related U.S. Patent Documents

Reissue of:

[64] Patent No.: 5,056,226
Issued: Oct. 15, 1991
Appl. No.: 649,419
Filed: Feb. 1, 1991

[51] Int. Cl.[6] ..... B26B 3/00
[52] U.S. Cl. ..... 30/169; 30/339
[58] Field of Search ..... 30/169, 337, 339, 85; 15/236.1

[56] References Cited

U.S. PATENT DOCUMENTS

| | | | |
|---|---|---|---|
| 4,955,138 | 9/1990 | Henke et al. | 30/169 |
| 4,979,300 | 12/1990 | Blank et al. | 30/169 |
| 5,010,647 | 4/1991 | Gray | 30/169 |

*Primary Examiner*—Douglas D. Watts
*Attorney, Agent, or Firm*—Bryan Cave; David M. Klein

[57] ABSTRACT

A hand-held tool for carrying a scraping/stripping blade. The tool includes a base element, [generally T-shaped in outline], including a handle and a blade receiver with a fixed jaw face oriented toward the central plane of the tool, and a lever aperture extending through the blade receiver adjacent to the handle. A locking aperture [in] *is* formed in the handle remote from the blade receiver means, with a locking rail disposed therein, oriented generally parallel to the blade receiver. A blade clamp is pivotally attached to the base element and includes a movable jaw face and a perpendicular blade clamping lever, divided into three portions in a zig-zag pattern, carrying a latch, adapted to engage the locking rail at its extremity, and an unlocking point at its distal end. The blade clamp pivots on an axis at the base of the fixed jaw face and the clamping lever extends through the lever aperture and into the locking aperture. In the open position, force applied to the locking point urges the latch against the locking rail, causing the lever to flex and allowing the latch to engage the locking rail. Similarly, in the locked position, force applied to the unlocking point causes the lever to bend in the opposite direction, allowing the latch to disengage from the locking rail.

This allows for quick blade insertion or blade reversal for convenient safe storage.

10 Claims, 3 Drawing Sheets

TOOL FOR CARRYING A SCRAPING OR STRIPPING BLADE

Matter enclosed in heavy brackets [ ] appears in the original patent but forms no part of this reissue specification; matter printed in italics indicates the additions made by reissue.

BACKGROUND OF THE INVENTION

This invention pertains to the field of hand-held tools, and more particularly to tools designed to carry replaceable, sharp blades for scraping or stripping surfaces.

A common task in home decorating, repair and renovation is the preparation of surfaces by removing existing paint, wallpaper and the like. Similarly, one often is faced with the task of removing articles attached to glass, ceramic or other smooth surfaces, including removing ice from windshields. The most convenient method of removing such items is scraping or stripping, either with or without an application of steam, water or other fluid to loosen the material, easing removal.

Although the common scraper or putty knife can be employed for some of these applications, these tools have fixed blades that prove too blunt to provide efficient removal of material. Even the "chisel point" style of scraper cannot provide efficient penetration for jobs such as stripping wallpaper or removing decals, etc., from glass. Thus, tools exist, generally referred to as "wall scrapers" or "wallpaper strippers", that provide a removable and replaceable razor-sharp blade, carried in a holder mounted on a handle, in a T-shaped configuration. These tools provide the stripping action desired, but the requirement for securely clamping the blade in position has resulted in structures that are very cumbersome to use. These tools generally employ some variation of screw fitting to clamp the blade, using machine screws that engage a threaded receptacle in the holder or to an external nut, or conversely providing a wing nut or the like in combination with a threaded stud.

All such arrangements make changing the blade a major undertaking, usually requiring a screwdriver or other tool. What users need is a tool that provides the razor-sharp stripping action needed, coupled with a rapid, easy method for changing or reversing blades for safe storage. That need has remained unmet until the advent of the present invention.

SUMMARY OF THE INVENTION

The broad object of the present invention is to provide a convenient tool for scraping or stripping coated surfaces.

A further object of the invention is to provide a scraping/stripping tool that allows the blade thereof to be removed, replaced or stored safely without using other tools.

Yet a further object of the invention is to provide a scraping/stripping tool that allows the blade thereof to be removed and replaced without manipulating screws, nuts or similar fastening hardware.

These and other objects are achieved in the present invention, a hand-held tool for carrying a scraping/stripping blade. The tool includes a base element, generally T-shaped in outline, including handle means forming the vertical portion of the T-shape and blade receiver means forming the crossbar of the T-shape. The blade receiver means including a fixed jaw, with a fixed jaw face generally adjacent to and oriented toward the central plane of the tool, and a lever aperture extending through the blade receiver means adjacent to the handle. A locking aperture extends through the handle at a location remote from the blade receiver means, with a locking rail disposed therein and oriented generally parallel to the blade receiver means. Blade clamping means are pivotally attached to the base element and include a movable jaw portion having a movable jaw face corresponding to the fixed jaw face and carried in registration with it.

A blade clamping lever extends generally perpendicular from the movable jaw portion, divided into three portions: A proximate leg is integral with and extends from the movable jaw portion and carries a locking point, oriented in the same direction as the movable jaw face. An offset leg is integral with and extends from the proximate leg at an offset angle, transverse to the plane defined by the movable jaw means and the proximate leg, and it carries a latch, adapted to engage the locking rail, located at the extremity of the offset leg. And a distal leg, integral with and extending from the offset leg at an angle such that the distal leg lies generally parallel to the proximate leg, carries an unlocking point, located at the distal end and oriented in a direction opposite from the movable jaw face.

The blade clamping means is mounted to pivot on an axis parallel with and adjacent to the base of the fixed jaw face, with the blade clamping lever extending through the lever aperture and disposed with the unlocking point extending into the locking aperture. The distance from the pivotal axis to the latch is less than the distance from that axis to the locking rail. As a result of this structure, the blade clamping means pivots from a locked position, in which the latch engages the locking rail, with the movable jaw face clamping the blade against the fixed jaw face, to an open position, in which the movable jaw face pivots away from the fixed jaw face to permit removal of the blade. In the open position, force applied to the locking point urges the latch against the locking rail, causing the proximate leg to flex, such that the offset leg bends away from the proximate leg, allowing the latch to engage the locking rail. Similarly, in the locked position, force applied to the unlocking point causes the offset leg to bend away from the proximate leg, allowing the latch to disengage from the locking rail.

DETAILED DESCRIPTION OF A PREFERRED EMBODIMENT

Figure 1:
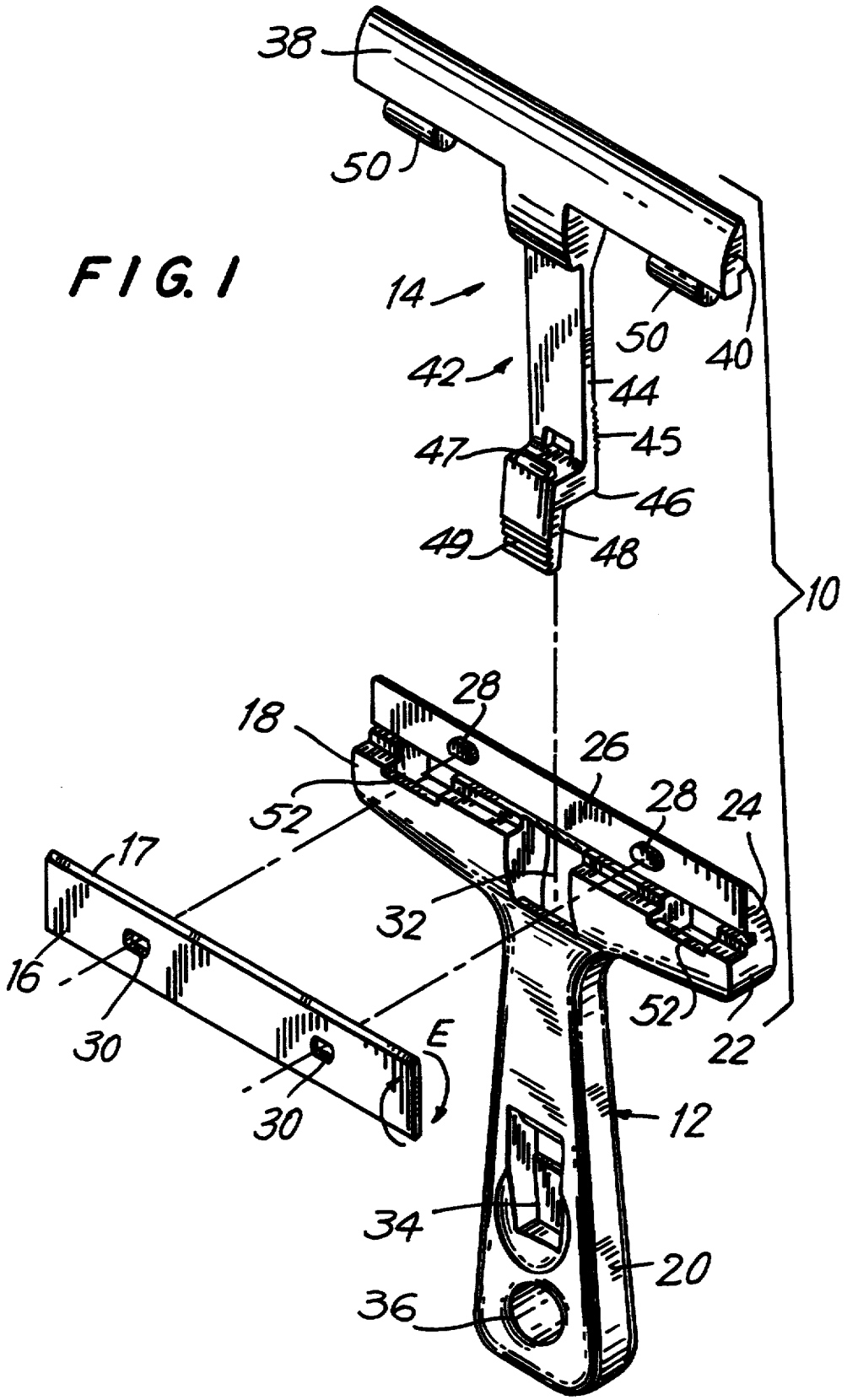
FIG. 1 is an exploded pictorial showing a preferred embodiment of the present invention.

A stripper/scraper 10 according to the present invention is shown in FIG. 1 in exploded form. As seen there, the tool consists of two major subunits, a base element 12 and blade clamp 14. As explained in more detail below, these elements cooperate to grip and carry a blade 16, which typically is a razor-sharp blade adapted to scraping wallpaper, paint and similar substances from walls, glass, ceramic or other such surfaces. Other blade structures may be employed, depending on the particular application. For example, a brass blade could be used when a softer material is desired for non spark applications, or a plastic blade could be utilized for scraping ice from windshields or the like. Both the base element and the blade clamp preferably are molded from a strong, resilient plastic material, such as an acetal resin. Those of ordinary skill in the art will understand that suitable materials can be readily selected from among commercially-available products, such as delrin.

Base element 12 is generally T-shaped, the crossbar of the T being formed by a blade receiver 18 and the vertical member being handle 20. The blade receiver is generally in the shape of the letter L, with a horizontal ledge 22 lying below a vertical fixed jaw 24. The outer surface of the fixed jaw may be curved, for aesthetic purposes, but the surface oriented toward the central plane of the tool forms a flat jaw face 26, dimensioned for clamping the blade. If desired, the jaw face may include lugs 28, adapted for mating with positioning cutouts 30 formed in the blade. A lever aperture 32, more fully detailed below, is formed in the blade receiver, generally centered on the receiver base element.

The handle 20 is adapted for gripping with the human hand, and can be shaped accordingly by those in the art. Preferably, the handle is slightly tapered, as shown in FIG. 1, with a length of about 4.5 inches. The thickness should provide a comfortable grip, preferably being about 0.5 inches at the distal end, tapering to about 0.25 inches at the point where the handle joins the blade receiver. A locking aperture 34 extends through the handle, located toward its distal end. This aperture, with its associated structures, [are] *is* set out fully below. A hanging aperture 36, at the extremity of the handle, may be provided for user convenience.

The second major element of the invention is the blade clamping assembly 14, which also has the general shape of the letter T. A movable jaw 38, with movable jaw face 40, makes up the crossbar, formed to correspond to the fixed jaw 24. The blade clamping lever 42 constitutes the vertical portion of the T, composed of three legs. A proximate leg 44 extends directly from the blade receiver 38; an offset leg 46 extends at an angle from the proximate leg, transverse to the plane defined by the movable jaw and the proximate leg; and a distal leg 48 in turn extends at an angle from the offset leg. Although other angular relationships could be chosen by those in the art, it is preferred that the proximate and distal legs be parallel, with the offset leg perpendicular to them.

Figure 5:
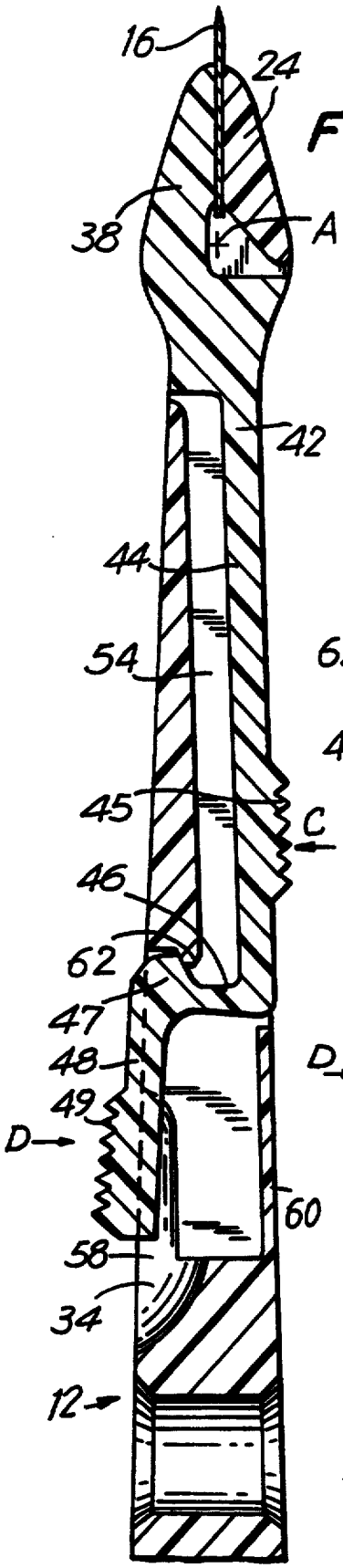
FIG. 5 is a cross-sectional side view, taken along plane 5—5 of FIG. 2.
Figure 6:
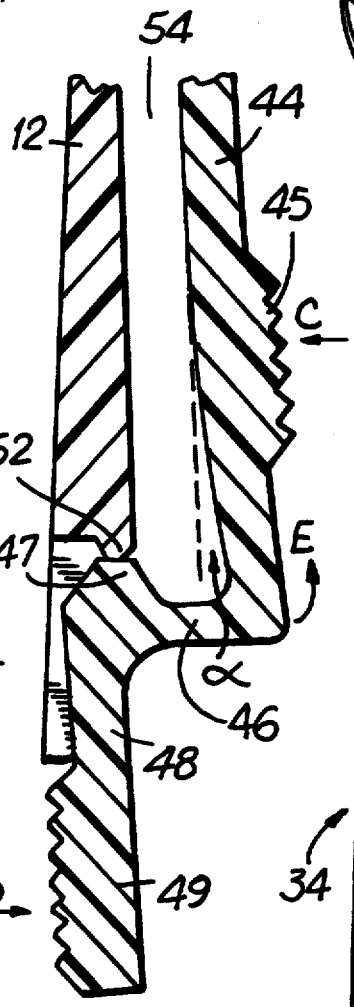
FIG. 6 is a detail cross-sectional view, depicting the operation of the embodiment of FIG. 1.
Figure 7:
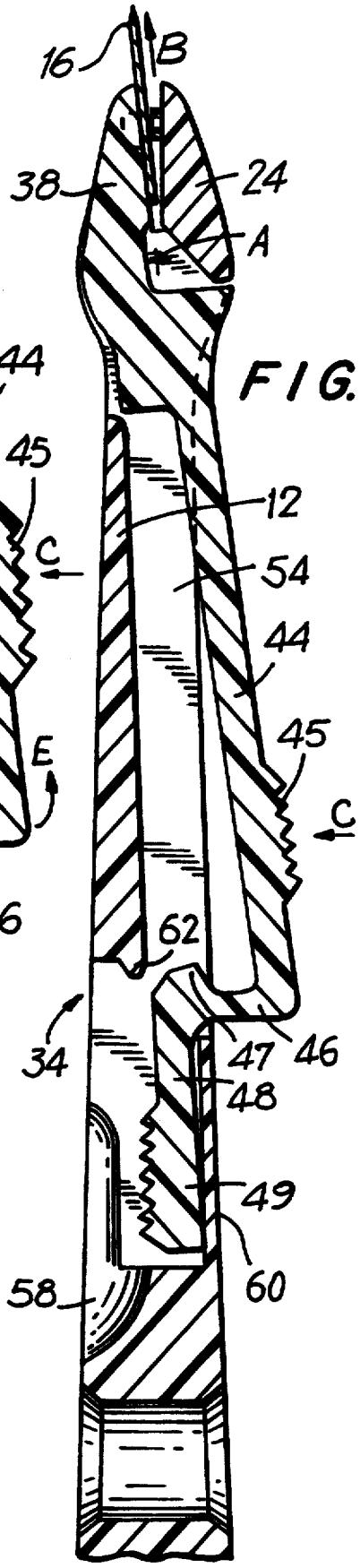
FIG. 7 is a cross-sectional side view, further depicting the operation of the embodiment of FIG. 1.

A locking point 45 is carried on the proximate leg, oriented in the same direction as that of the movable jaw face, and a similar unlocking point 49 is formed on the distal leg, oriented in an opposite direction. These points are designed for the application of force by an operator's finger, and can be molded in any shape desired. As shown, it is preferred to define these points as a series of grooves molded in the surface of the respective legs. These points may be molded as slightly raised areas, as seen in FIGS. 5–7. A latch 47, shaped as a generally triangular, truncated ridge, projects from the offset leg, preferably in a direction parallel to the handle. The function and design criteria of these elements will be clear following the discussion of their operation, below.

Figure 4:
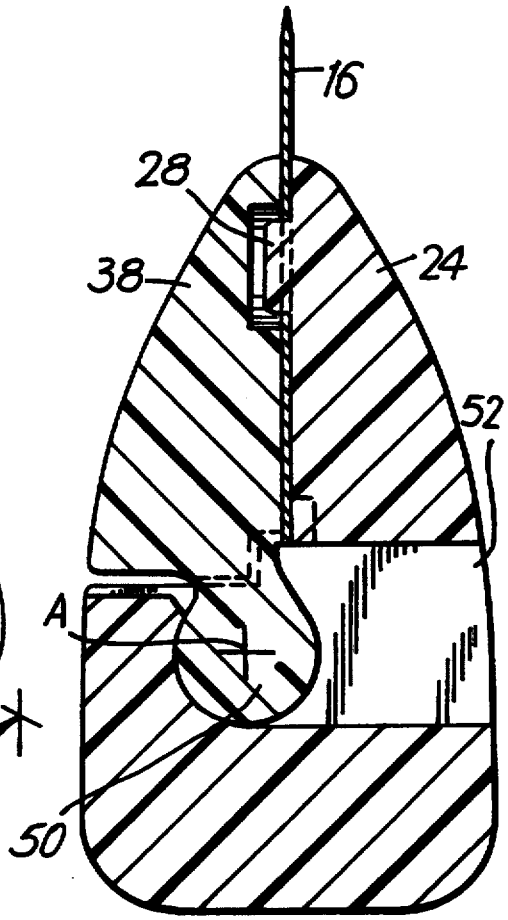
FIG. 4 is a detail cross-sectional view, taken along plane 4—4 of FIG. 3.

The blade clamping assembly 14 is mounted on the base element 12 so that the movable jaw 38 lies in registration with the fixed jaw 24 and pivots on an axis A (FIG. 4) parallel to and immediately below movable jaw face 26. To that end, pivot projections 50 extend from the underside of the movable jaw. Preferably, two such projections are provided, located symmetrically. As best seen in FIG. 4, the projections preferably have a generally circular cross-section and extend downward, generally parallel to movable jaw face 40. The projections are received in pivot cutouts 52, formed in base element 12. For ease of manufacture, these cutouts may extend completely through the base element. The cutouts are dimensioned such that the pivot projections may be snapped in, with sufficient play to permit easy rotation, yet tight enough to provide a firm holding action for the blade 16. Mounting the blade clamping assembly proceeds by passing the blade clamping lever 42 through lever aperture 42 and snapping the pivot projections into the cutouts.

Figure 2:
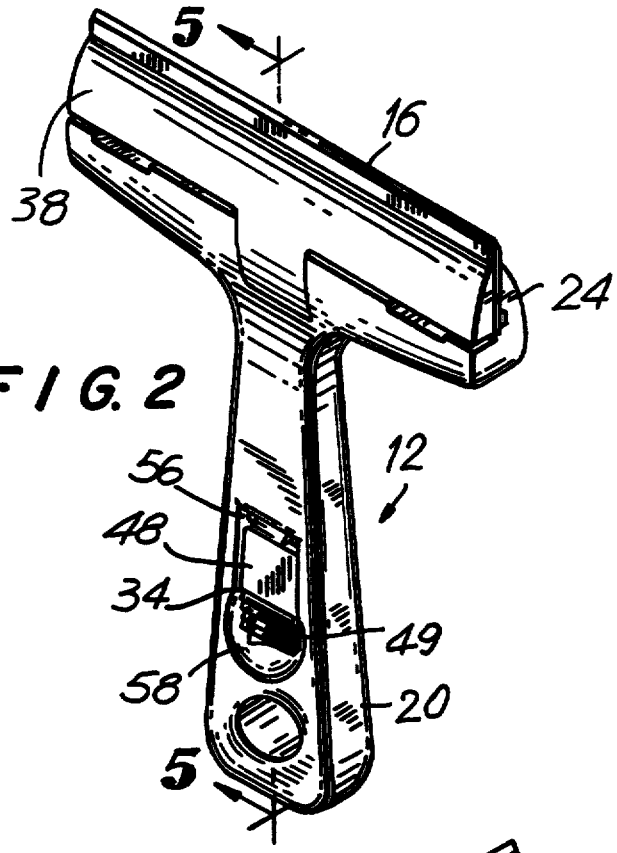
FIG. 2 is a pictorial showing the top side of the embodiment of FIG. 1.
Figure 3:
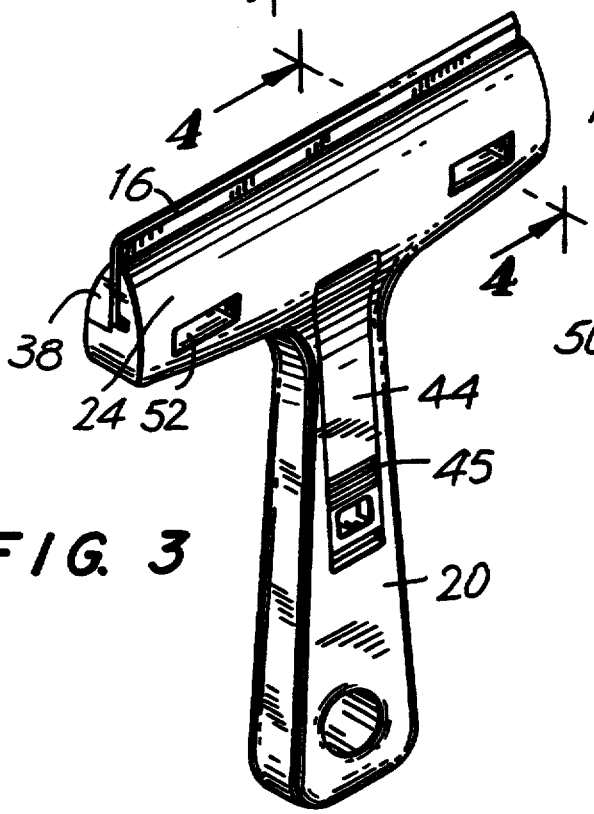
FIG. 3 is a pictorial showing the bottom side of the embodiment of FIG. 1.

The clamping lever extends along the handle, preferably lying in channel 54, which extends from the lever aperture to locking aperture 34, dimensioned to accept the clamping lever, as seen in FIGS. 3 and 5. The channel is formed with sufficient depth so that the clamping lever lies generally flush with the surface of the handle, with room beneath to flex slightly downward. Locking aperture 34 is designed to accept and cooperate with the clamping lever. On the side of the handle opposite to the fixed jaw 24, the locking aperture has the general shape of a keyhole (FIG. 2), with a rectangular portion 56 designed to accommodate the distal leg 48 of the clamping lever, and a circular, chamfered thumb well 58 surrounding the unlocking point 49. The clamping lever extends into the locking aperture, as depicted in FIG. 5, and from that drawing one can appreciate that the length of the offset leg 46 is chosen such that the proximate leg can lie generally flush with, or slightly above, one [the] surface of the handle, with the distal leg lying generally flush with, or slightly above, the opposite handle surface. To limit the travel of the clamping lever, locking aperture 34 may be provided with a baffle 60, opposed to the thumb well 58.

A locking rail 62 is disposed in the locking aperture 34, at the upper end thereof (that is, the end of the locking aperture toward the fixed jaw 24). That rail is designed to cooperate with latch 49, and thus it preferably is a raised ridge, oriented generally parallel to the base element 12. From FIG. 5 it can be seen that the locking rail can be formed at the point where channel 54 opens into the locking aperture. Similarly, it will be understood that cooperation between the locking rail and the latch is made possible by dimensioning the clamping lever 42 such that the distance from axis A to the tip of latch 49 is slightly less than the distance from that point to the tip of locking rail 62. Thus, when the unit is in a locked position, as shown in FIG. 5, the latch is retained by the locking rail, preventing angular movement of the clamping lever.

The resulting structure provides a gripping action similar to that observed in a pair of pliers. In a locked position, seen in FIG. 5, the blade 16 is firmly held between the fixed and movable jaws, secured by the cooperative action of the latch and locking rail. In an open position, shown in FIG. 7, the movable jaw is rotated away from the fixed jaw, permitting removal of the blade in direction B.

Movement between the open and closed positions is shown in FIGS. 5–7. To move from the locked position (FIG. 5), the operator applies force D to the unlocking point 49, preferably by pressing with a thumb or finger. That force is applied through latch 47 to locking rail 62, causing the end of distal leg 48 to rotate into the thumb well 58, pivoting around the latch and in turn rotating the offset leg 46 upward as shown by arrow E (FIG. 6), flexing proximate leg 44 into channel 54 by an angle alpha. Latch 47 therefore is moved out of engagement with the locking rail 62, allowing the clamping lever 42 to move to the open position of FIG. 7. Locking the unit involves the same sequence of forces, actuated by applying a force C to locking point 45. Again, the latch is pressed against the locking rail, causing the proximate leg to flex and rotating the latch beyond the locking rail and moving the clamping lever to the locked position of FIG. 5. With this operation in mind, it should be clear to those in the art that the proximate leg should be dimensioned to allow sufficient flexural resilience to provide the motions described.

It should be noted that the device can be configured with blade 16 in either a working position or a safe position. As shown in FIG. 1, the cutting edge 17 of blade 16 is oriented outward, away from the body of the tool, for scraping and stripping. During storage or transport, the blade can be reversed, as shown by arrow E (FIG. 1) with cutting edge 17 disposed within the clamping jaws, in a safe position. To permit this reversibility, lugs 28 and cutouts 30 are located on the centerlines of jaw face 26 and blade 16, respectively.

It will be appreciated that modifications and alterations to the illustrated embodiment may be made without departing from the spirit of the invention. For example, the latch and locking rail can be positioned or formed differently, so long as these two [element] *elements* cooperate in providing the locking function. Similarly, the material disclosed could be altered to suit particular environments. These and other changes may be made within the scope of the present invention, which is defined solely by the claims appended hereto.

I claim:

1. A hand-held tool for carrying a scraping/stripping blade, comprising:

a base element, [generally T-shaped in outline,] including handle means adapted for gripping by a human hand, and blade receiver means for holding the blade, having a lever aperture extending therethrough;

said handle including a locking aperture extending through said handle at a location remote from said blade receiver means, with a locking rail disposed therein;

blade clamping means, pivotally attached to said base element and including movable jaw means for clamping the blade against a portion of said base element;

a blade clamping lever extending generally perpendicular from said movable jaw portion and including a proximate leg, integral with and extending from said movable jaw portion and carrying thereon a locking point, oriented in the same direction as said movable jaw face;

an offset leg, integral with and extending from said proximate leg at an offset angle thereto, in a direction transverse to the plane defined by said movable jaw means and said proximate leg, carrying thereon a latch, adapted to engage said locking rail, located at the extremity of said offset leg; and a distal leg, integral with and extending from said offset leg at an angle such that said distal leg lies generally parallel to said proximate leg, and carrying thereon an unlocking point, located at the distal end thereof and oriented in a direction opposite from said movable jaw face;

wherein said blade clamping means is mounted to pivot on said base element, said blade clamping lever extending through said lever aperture and disposed with said unlocking point extending into said locking aperture, the distance from said pivotal axis to said latch being less than the distance from said pivotal axis to said locking rail;

such that said blade clamping means pivots from a locked position, in which said latch engages said locking rail, with said movable jaw face clamping the blade against said fixed jaw face; and an open position, in which said movable jaw face pivots away from said fixed jaw face to permit removal of the blade; and wherein, in said open position, force applied to said locking point urges said latch against said locking rail, causing said proximate leg to flex, such that said offset leg bends away from said proximate leg, allowing said latch to engage said locking rail; and, wherein, in said locked position, force applied to said unlocking point causes said offset leg to bend away from said proximate leg, allowing said latch to disengage from said locking rail.

2. The hand-held tool of claim 1, wherein said blade receiver means including a fixed jaw, with a fixed jaw face generally adjacent to and oriented toward the central plane of the tool.

3. The hand-held tool of claim 1, wherein said base element means and said blade clamping means are formed from an acetal resin material.

4. The hand-held tool of claim 1, wherein said base element means and said blade clamping means are formed from a resilient plastic material.

5. The hand-held tool of claim 1, wherein said blade receiver means including a fixed jaw, with a fixed jaw face generally adjacent to and oriented toward the central plane of the tool, and said movable jaw means includes a movable jaw face corresponding to said fixed jaw face and carried in registration therewith.

6. A hand-held tool for carrying a scraping/stripping blade, comprising:

a base element, [generally T-shaped in outline,] including handle means [forming the vertical portion of said T-shape and] *adjacent to* blade receiver means [forming the crossbar of said T-shape], said blade receiver means including a fixed jaw, with a fixed jaw face generally adjacent to and oriented toward the central plane of the tool, and a lever aperture extending through said blade receiver means adjacent to said handle;

said handle including a locking aperture extending through said handle at a location remote from said blade receiver means, with a locking rail disposed therein and oriented generally parallel to said blade receiver means;

blade clamping means, pivotally attached to said base element and including a movable jaw portion having a movable jaw face corresponding to said fixed jaw face and carried in registration therewith;

a blade clamping lever extending generally perpendicular from said movable jaw portion and including a proximate leg, integral with and extending from said movable jaw portion and carrying thereon a locking point, oriented in the same direction as said movable jaw face;

an offset leg, integral with and extending from said proximate leg at an offset angle thereto, in a direction transverse to the plane defined by said movable jaw means and said proximate leg, carrying thereon a latch, adapted to engage said locking rail, located at the extremity of said offset leg; and a distal leg, integral with and extending from said offset leg at an angle such that said distal leg lies generally parallel to said proximate leg, and carrying thereon an unlocking point, located at the distal end thereof and oriented in a direction opposite from said movable jaw face;

wherein said blade clamping means is mounted to pivot on an axis parallel with and adjacent to the base of said fixed jaw face, said blade clamping lever extending through said lever aperture and disposed with said unlocking point extending into said locking aperture, the distance from said pivotal axis to said latch being less than the distance from said pivotal axis to said locking rail;

such that said blade clamping means pivots from a locked position, in which said latch engages said locking rail, with said movable jaw face clamping the blade against said fixed jaw face; and an open position, in which said movable jaw face pivots away from said fixed jaw face to permit removal or reversal of the blade; and wherein, in said open position, force applied to said locking point urges said latch against said locking rail, causing said proximate leg to flex, such that said offset leg bends away from said proximate leg, allowing said latch to engage said locking rail; and, wherein, in said locked position, force applied to said unlocking point causes said offset leg to bend away from said proximate leg, allowing said latch to disengage from said locking rail.

7. The hand-held tool of claim 6, wherein said base element means and said blade clamping means are formed from an acetal or other resilient plastic resin material.

8. The hand-held tool of claim 6, wherein said base element means and said blade clamping means are formed from DELRIN plastic material.

9. The hand-held tool of claim 1, wherein said blade clamping means is adapted to clamp the blade in either a working position, with the sharpened edge blade exposed, or a safe position, with said sharpened edge shielded by [and] *said* blade clamping means.

10. The hand-held tool of claim 6, wherein said blade clamping means is adapted to clamp the blade in either a working position, with the sharpened edge blade exposed, or a safe position, with said sharpened edge shielded by [and] *said* blade clamping means.

* * * * *